Jan. 5, 1965  D. O. McCREIGHT ETAL  3,164,483

PARTICULATE REFRACTORY MATERIAL

Filed Sept. 24, 1963

Inventors
Donald O. McCreight
Albert L. Renkey
Ben Davies
By *William C. Nealon*
Attorney

United States Patent Office 3,164,483
Patented Jan. 5, 1965

3,164,483
PARTICULATE REFRACTORY MATERIAL
Donald O. McCreight, Bethel Park, and Albert L. Renkey and Ben Davies, Pittsburgh, Pa., assignors to Harbison-Walker Refractories Company, Pittsburgh, Pa., a corporation of Pennsylvania
Filed Sept. 24, 1963, Ser. No. 311,247
13 Claims. (Cl. 106—44)

This application is a continuation-in-part of copending application, Serial Number 177,649, filed March 5, 1962, now abandoned in prior of the present application.

This invention relates to refractories, and more particularly to unfired refractories suitable for use in high temperature operations. It is well known and understood in this art that the refractory material utilized as the lining for a furnace or the like must be compatible with the slag and/or molten metal, as the case may be, which may potentially contact the lining. Exemplary of the foregoing is the use of an acid refractory in acid open hearth process and the use of basic refractory in basic open hearth processes. Similarly, in induction furnaces, such as those used in melting aluminum, it is conventional to use a high alumina refractory material to have compatibility.

Experience in the metallurgical industry has shown that it is not always possible to provide a refractory lining which is highly resistant to both the slag and the molten metal present. In some instances, the chemistry of the slag is such that it is extremely corrosive in contact with a refractory; whereas, the same refractory might be quite satisfactory with the molten metal being treated. The foregoing has been an important consideration in the development of refractories for the linings of the converter in the basic oxygen converter steel process. In this process, the early slag is relatively high in silica; whereas, subsequently formed slag is relatively high in iron oxide with lesser percentage quantities of silica.

In copper producing furnaces, the molten metal has a different reactivity relative to the refractory material of the furnace than does the matte or slag, and further the oxidation level of the furnace atmosphere will to some extent govern the penetrating power of the molten metal itself. For a discussion of furnaces for melting copper and copper alloys and by way of background, see, for example, the book Copper, The Science and Technology of the Metal, Its Alloys and Compounds, by Allison Butts, published in 1954 by the Reinhold Publishing Corporation. See, in particular, chapter 10, beginning page 249, entitled "Induction Melting of Copper and Copper Alloys." Induction furnaces are reported to operate with a temperature in the metal bath of about 2100° F.

Depending on which metallurgical process the refractory is to be used with, it may be fired or unfired, it may be an unconsolidated material formed in place, as a ramming mix to be used in fabrication of a monolithic refractory, brick, and the like. In the art to which this invention relates "unconsolidated" means not formed to a shape before use. It is a "particulate" material in the sense that it is not so formed.

The instant invention is particularly concerned with unfired refractories, whether they be performed or not, which are substantially different from their fired counterparts; and have lower permeability, apparent porosity, and thermal conductivity than their fired counterparts. It has been found that even after unfired refractories according to this invention have been placed in service these latter characteristics are largely maintained due to the thermal gradient through a furnace structure in which they are used. In the art to which this invention relates, the terminology "unfired" is used to distinguish ware from that which is "ceramically bonded" or burned to obtain sintering and/or ceramic union between the particulate material used to make it.

It has been recognized by those versed in the art that the most effective refractory lining material would be that which would resist wetting by the molten metal and/or slag with which it would be in contact in service. Experience has also demonstrated that the inclusion of a reducing agent in the form of amorphous carbon and graphite to refractory monolithic materials (for example, refractory plastics, castables, ramming mixes, and the like) imparts definite resistance to the penetration and wetting by various molten metals and slags. Carbon blocks are another example of prior use of carbonaceous materials.

Generally, carbonaceous refractories have certain very distinct disadvantages which have severely limited their use. Solid carbon and graphite materials are not only very expensive but are rapidly consumed, particularly in the presence of oxygen and high temperature. Also, they are good conductors of heat thus undesirably permitting expensive furnace heat to be rapidly lost through furnace walls. When carbon powder or graphite is mixed with other materials, such as oxides or silicates in an effort to keep cost down or to minimize other undesirable effects such as oxidation, much is sacrified and little is gained. Graphite-containing plastics used in lining foundry ladles, for example, have poor strength and poor oxidation resistance unless altered with a glassy flux which severely impairs refractoriness and resistance to wetting. And, of course, since graphite and amorphous carbon refractories have high electrical conductivity, their use has been severely restricted in electrically-heated furnaces wherein insulation against current flow is of paramount importance.

The patent to Greene, United States Patent Number 1,455,748, disclosed the addition of carbon, or broadly, a carbonaceous material, to MgO or $SiO_2$ and clay, and to use the resulting mixture as an induction furnace lining. However, while satisfactory to some extent, the Greene mixture tended to be less dense than desired; and, since carbonaceous material in the resulting refractory structure therein disclosed tended to be relatively fluffy and light, it was quite rapidly oxidized and/or eroded by the molten material in service, thereby rapidly eating away the interior structure of the material and lessening the useful operating life of the installation.

The patent to Fisher, United States Patent No. 2,141,600, suggests a procedure whereby some of the problems encountered with the Greene mix could be countered. In essence, Fisher is directed to a magnesia refractory to which is added an amorphous carbonaceous material, graphite, or possibly an "allotropic" form of carbon such as silicon carbide, a binding agent, and preferably an additional flux material. The sum purport of Fisher appears to be the provision of a coating over the carbonaceous inclusion to thereby slow its loss by oxidation with molten metal or slag. The bonding or binding and flux materials of Fisher tended to result in a glassy matrix. Of course, a glassy matrix predisposes a refractory structure to slag or melt penetration by providing an inherent, continuous network of poor resistance through the body, thereby tending to reduce its range of application and its useful life. Fisher also discussed the difficulties encountered in providing a suitable refractory for melting copper metal, and suggested that his refractory mix, including a carbonaceous reducing agent, was satisfactory in contact with molten copper since the copper oxide was reduced on contact.

In laboratory tests and in actual service installations using refractory compositions including graphite, the graphite was burned out after relatively short periods of operation. In such an instance, the graphite is burned away from the hot face and the refractory then undergoes penetration and corrosion, sometimes completely through the refractory, causing serious and costly shutdown of equipment.

Further, graphite-containing mixes have been found to be typically weak and of low density, making them susceptible to shrinkage cracking in service and erosion by the wash of the copper metal.

Accordingly, it is an object of this invention to provide new and improved unfired refractories; which are particularly useful in fabrication of monolithic structures; which have low permeability, apparent porosity, and resistance to electrical flow and heat flow.

A further object of the invention is to provide an unfired refractory material including very finely divided silicon carbide and a fireclay or high alumina castable which resists wetting by a variety of metals, melts and slags.

Still another object is to provide an improved plastic refractory.

And yet another object is to provide an improved ramming mix particularly useful in forming a rammed monolithic lining for an induction furnace.

It is another object of the invention to provide refractories for use at high temperature in structures which exhibit exceptional resistance to penetration and corrosion by liquid slags and metals. A further object of the invention is to provide such refractories which, because of their unique density and strength characteristics, resist oxidation and have sufficient strength as to resist abrasion and erosion in use.

Briefly, in one embodiment, this invention is largely predicated on the discovery that very finely divided silicon carbide can be incorporated into various fireclay and high alumina mixes without deleteriously affecting the physical properties thereof and with highly beneficial effects. Silicon carbide, according to the concepts of this invention, exhibits high oxidation resistance as compared to amorphous carbon or graphite, and exhibits a high retardation of molten metal penetration.

Other objects, and further features and advantages of unfired refractories according to the concepts of this invention, will become readily apparent to those skilled in the refractory art from a study of the following detailed description with reference to the appended exemplary drawings. In these drawings.

Figure 1:
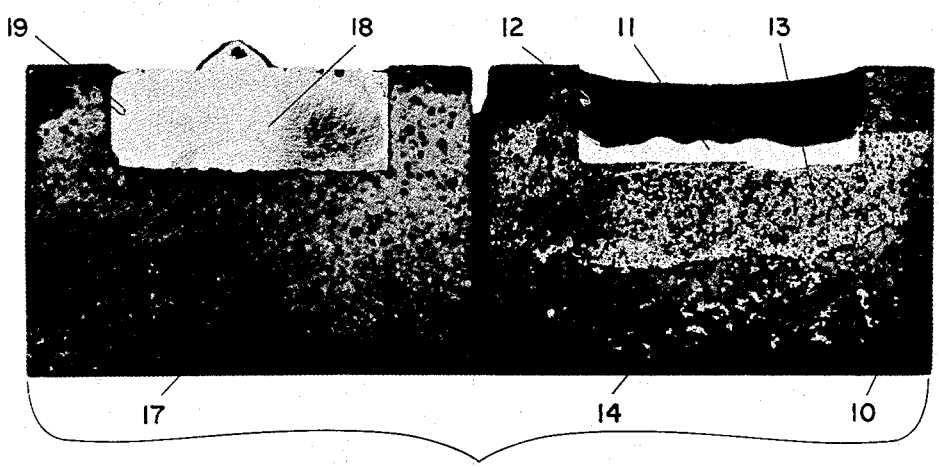
FIG. 1 is an enlarged reproduction of cut sections through comparative laboratory test cups, exhibiting relative resistance to wetting and penetration by molten metal.

To investigate the resistance of refractory compositions having a quantity of very finely divided silicon carbide added thereto, to metal penetration and wetting, and to compare the silicon carbide fines in this respect to other possible carbonaceous additions, a group of four mixes was studied. Table I sets further the composition of the mixes tested.

Table I

| Mix | B-1 | B-2 | B-3 | B-4 |
|---|---|---|---|---|
| Fireclay Castable Base,[1] Percent | 100 | 85 | 85 | 85 |
| Fine Graphite, Percent | | 15 | | |
| Milled Pitch, Percent | | | 15 | |
| Silicon Carbide Fines (−325 mesh), Percent | | | | 15 |
| Water Added, Percent | 11.5 | 16.3 | 18.0 | 15.0 |
| Workability | All four mixes cast well; except for B-3 the mixes showed very good overnight set; the set of B-3 was only moderate. | | | |
| Bulk Density, p.c.f., after drying at 230° F. (Av. 5) | 131 | 117 | 104 | 131 |
| Modulus of Rupture, p.s.i., after drying at 230° F. (Av. 2) | 920 | 340 | 470 | 1,100 |

[1] The Fireclay Castable Base which is used in each of the mixes consists of the following (parts by weight): Calcined flint clay (80 to 90% about −3 +65 mesh)—60; Calcined flint clay (ball mill fines nominally 100% −65 mesh, 40 to 60% +325)—5; Calcium aluminate cement (all −100 mesh and about 60 to 75% being −325 mesh)—18; Ball clay or equivalent plasticizer (all −325 mesh, average particle diameter is 2 to 5 microns)—2.

The mixes were cast to 9 x 4½ x 2½ inch brick and a pocket 1 inch deep and 3 inches in length and width was cut in the 9 x 4½ inch face. Molten metal or slag was deposited in the cup and held at a predetermined temperature for 5 hours. The brick was then cooled and sawed through the center of the pocket parallel to the 4½ x 2½ inch faces to observe penetration.

In these tests, nickel matte slag was added and the brick and slag statically tested at 2600° F. for 5 hours. The B-1 brick (entirely of Fireclay Castable Base) corroded about ½ inch deep peripherally of the slag pocket. None of slag was retained in the pocket and most of it penetrated almost to the exterior periphery of the brick. Generally, the appearance was very poor.

The B-2 brick (85% of Fireclay Castable Base) showed about ⅛ inch deep penetration on the surface of the cup and the sides where the boiling nickel matte ran down. Very little corrosion was in the cup; no additional penetration. On the freely exposed sides, the graphite burned out about ⅝ inch deep. Appearance was fair; most of the metallic charge was retained. The boiling of the slag is probably an indication of gas evolution from the refractory as a result of rapid oxidation of the graphite.

The B-3 brick (also 85% of the Fireclay Castable Base) with 15% ball milled pitch was generally similar to cup B-2, above, but definitely inferior. There was more corrosion, the pitch burned out 1 inch deep, and much less of the metallic charge was retained. Appearance was poor.

The B-4 brick (this too was 85% of the Fireclay Castable Base) with 15% silicon carbide fines showed a little boiling and corrosion on the surface of the cup, but none in the cup. There was no penetration; essentially all of the metallic charge was retained; and it had excellent appearance.

While additions of graphite or milled pitch seriously reduced the density and strength of the castable, the addition of our invention (B-4) resulted in unchanged density and a substantial improvement in strength. In furnace service, the lack of density and strength in the graphite and pitch-containing mixes would compound their destruction as the dynamic forces of impact and wash caused physical erosion.

Results of a second and more comprehensive laboratory testing program are shown in Table II. This study was undertaken to find the best refractory available to resist a complex $CaO$—$SiO_2$—$P_2O_5$—$K_2O$ melt in a newly developed commercial process. Conventional slag-resistant brick types (A and B) were included as well as two types of graphite-containing monoliths and two examples of monoliths of our invention. Mixes C and F are a direct comparison between fireclay plastics containing graphite versus those of our invention containing silicon carbide fines with no protective flux.

Mix D was introduced for further comparison. Mix D contains graphite but no added glass to prevent oxidation of the carbon. Mix D resisted the slag much better than Mix C but not nearly as well as Mix F. It was also noted that the melt boiled up in the Mix D cup indicating gas formation due to oxidation of the carbon and, if the test had been of longer duration, Mix D would undoubtedly have been penetrated by the melt.

While the presence of glass in Mix C was greatly responsible for the rapid slag erosion, comparison of the density and strength figures for Mixes C and F also reveals an important aspect of the tests. Fireclay and high-alumina mixes, containing fine graphite or amorphous carbon, simply cannot be formed to sufficient density and strength as to prevent oxygen infiltration and erosion by furnace wash. Mixes F and D can be compared in strength but not in density since Mix D used a much denser base grain.

been formed. The material of this invention is non-wettable as is indicated by formation of such a convex meniscus.

In actual field tests, the use of Ramming Mix E of Table II has resulted in a number of cases of more than 100% increased campaign life in low frequency induction furnaces such as discussed by Fisher; while the replacement of Mix C with Mix F in gray iron foundry ladles resulted in 40% better life. These dramatic improvements are the results of a combination of improved nonwetting characteristics and improved physical properties.

The unusual advantages of our invention have not been confined, however, to any small group or type of furnace melts but rather have been found to apply to an unexpectedly large range of compositions. Destructive melts controlled by the refractories of our invention not only include complex mixtures such as nickel matte and foundry

*Table II*

LABORATORY TESTS WITH COMPLEX $CaO$–$SiO_2$–$P_2O_5$–$K_2O$ MELT

| | Refractory | Bulk Density (p.c.f.) | Modulus of Rupture (p.s.i.) | Cup Slag Test at 2,700° F. | |
|---|---|---|---|---|---|
| | | | | Linear Change In Test Specimen, Percent | Appearance of Test Specimen After Testing |
| A | Dense 85% Alumina Brick [1] | 179 | 2,600 | −0.5 | Marked reaction and undercutting at slag line with penetration more than 1" beyond original cup bottom. |
| B | Dense Magnesite Brick | 183 | | +0.2 | No undercutting at slag line or evidence of reaction with refractory. Slag retention nil, however, all but a surface skin soaking into specimen. |
| C | Conventional Fireclay Plastic Containing Graphite and Glass to Retard Oxidation. | 129 | 390 | +0.9 | Severe undercutting at slag line permitted slag to escape through side of pocket. |
| D | Conventional 60% $Al_2O_3$ Plastic Containing Graphite and No Flux Addition. | 138 | 300 | +0.7 | Refractory seemed resistant to penetration and reaction, although slag had boiled up to vesicular mass. Marked undercutting at slag line but no breakout. |
| E [2] | High Alumina Ramming Mix of Our Invention, Containing 10% SiC fines (substantially all −325 mesh) and No Flux. | 175 | 2,600 | +0.4 | Slight erosion in bottom of cup but no penetration and essentially all slag retained in cup. No undercutting at slag line. |
| F [2] | Fireclay Plastic of Our Invention Containing 15% SiC Fines (substantially all −325 mesh), No Added Flux. | 136 | 500 | +0.9 | No apparent penetration or erosion of refractory. No undercutting at slag line. Essentially all slag retained in cup. |

[1] Commonly used in slagging applications.
[2] See Table III, infra, for the specific composition of Mixes E and F.

Figure 3:
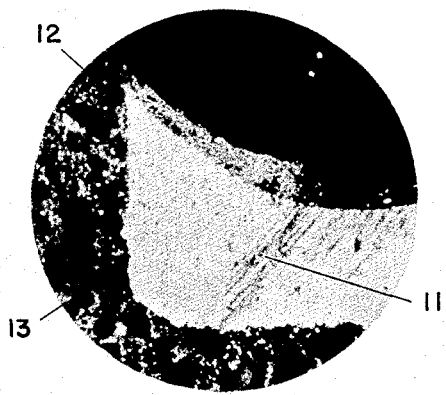
FIG. 3 is an enlarged fragmentary detail of the other cups of FIG. 1.

FIG. 1 is a photographic reproduction of two test specimens. Specimen 17 is intended as indicative of the degree of nonwetting which can be obtained with reducing conditions or agents. Specimen 10 indicates the disastrous results which can occur when a refractory is wettable by the slag and molten metal it may contact. The amount of slag 11 (specimen 10) retained is relatively small and the periphery of the pocket 12, as at 13, indicated substantial penetration of the specimen. Some of the slag, as at 14, penetrated to substantially the bottom of the specimen. In the detail of FIG. 3, the apparent wetting by the slag of the specimen is indicated by the formation of a concave meniscus.

Figure 2:
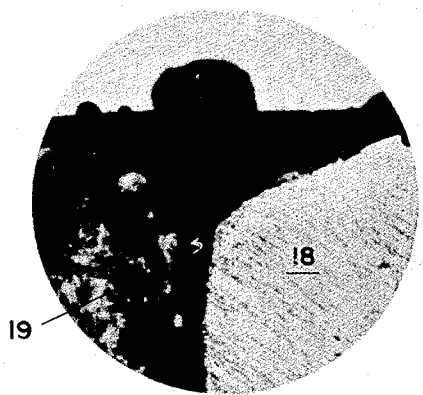
FIG. 2 is an enlarged fragmentary detail of one of the cups of FIG. 1.

In contradistinction, specimen 17 retained the slag 18 with no penetration of the walls of slot 19. FIG. 2 is indicative of non-wetting in that a convex meniscus has slag, which have been traditionally difficult, but also such notorious "bad actors" of rather simple composition such as $V_2O_5$ and borax.

The fact that there is no chemical common denominator among these various melt examples strongly supports the highly improved physical characteristics of refractories according to our invention. Our tests established that fine amorphous carbon or graphite cannot be successfully substituted for the silicon carbide fines of our invention. The tests also established that the silicon carbide fines can be physically incorporated into refractory mixes which have otherwise suitable characteristics of high density, high strength, and resistance to penetration without detriment to such mixes.

Table III shows composition details for Mix B-4 of Table I and Mixes E and F of Table II.

Table III

| | Mix B-4, Percent | Mix E, Percent | Mix F, Percent |
|---|---|---|---|
| Calcined flint clay (80 to 90% about −3 +65 mesh) | 60 | | 35 |
| Calcined bauxite (80 to 90% about −3 +65 mesh) | | 60 | |
| Quartzite (80 to 90% about −6 +65 mesh) | | | 25 |
| Calcined flint clay (ball mill fines nominally 100% −65 mesh, 40 to 60% +325) | 5 | | 10 |
| Calcined bauxite (ball mill fines nominally 100% −65 mesh, 40 to 60% +325) | | 15 | |
| Calcium aluminate cement (all −100 mesh and about 60 to 75% being −325 mesh) | 18 | | |
| Ball clay or equivalent plasticizer (all −325 mesh, average particle diameter is 2 to 5 microns) | 2 | 15 | 15 |
| Silicon carbide fines (−325 mesh, average particle diameter is about 1 to 10 microns) | 15 | 10 | 15 |
| Total | 100 | 100 | 100 |

The examples above illustrate one each of refractory monolith types falling within the scope of our invention, a castable, a ramming mix and a plastic, respectively. It will be appreciated that many variations are possible within each of the broad types and that the teachings of the invention will apply to other monolith types such as mortars and gunning mixes of the wet or dry type.

The silicon carbide fines used in our invention are preferably about −325 mesh or finer and it is one of the distinctive and surprising features of our invention that such fine material, with high surface area and hence high protective value, can be employed without excessive oxidation loss in the absence of additions of glasses or fluxes to shield from oxidation. It is another surprising feature that the resulting structures are highly resistant to electric current and heat flow despite the silicon carbide inclusion.

Such fines are conveniently and inexpensively obtained as reject sizes in the preparation of cutting and polishing tools or as dust collector fines from plants preparing silicon carbide sizes for resale. About 5% of such fines incorporated within our mixes is the minimum amount which will exhibit the non-wetting melt-resistant effects desired, the remainder is the aggregate.

The upper limit of silicon carbide fines usable is not controlled by loss of the melt resistant effects but rather by considerations such as cost, thermal conductivity, and overall size grading suitable to yield the necessary dense, tight structure essential for the operation of the invention. For example, 50% by weight of −325 mesh silicon carbon fines can not be incorporated into a castable mix without undesirably affecting density. Even coarser sizes of silicon carbide are effective in repelling slags and melts, although not nearly as effective as the finer sizes on a weight basis.

As a further example, while only 5%, by weight, of −325 mesh silicon carbide in a mix provides adequate protection against melt penetration, to obtain equivalent protection, about 10% is required if in the −200 mesh range; and about 20% if the silicon carbide is −100 mesh, range. Coarser grades provide some degree of protection against melt penetration, but the amount required is so large as to be prohibitive since the mixes are very expensive, excessively heavy and of two high thermal conductivity. The −200 mesh example above typically contains about 50% of −325 mesh particles while the −100 mesh example typically contains about 30% of −325 mesh. Thus when, for example, 20% of a −100 mesh type is added to a refractory mix the net result will be incorporation of about 6% of the most effective −325 mesh particles.

As an upper limit of −325 mesh silicon carbide, up to about 30% by weight may be included in the mix, which of course increases the degree of protection against melt penetration, the 70% remainder is the aggregate. However, greater amounts, as the 50% by weight example above, are not usable since the desired dense, tight structure cannot be obtained.

Generally speaking, the refractory composition of this invention is size graded so that the coarser, +65 mesh portion is the aggregate and the fines are silicon carbide. Details of the silicon carbide sizing is set forth above. The aggregate is obtained by grinding or otherwise comminuting lump material until it substantially all just passes a 3 or 6 mesh screen. This material is referred to as −3 or −6 mesh material in the art to which this invention relates. The particle distribution curve which is descriptive of percentages on subsequent smaller sieves or screens is, of course, variable, depending on the lump material being considered. As a general rule, though, when 80 to 90% of selected aggregate of this invention has been reduced to pass a 3 or 6 mesh screen, from 50 to 90% is retained on a 65 mesh screen. Therefore, for purposes of this invention, the sizing of the alumina, aluminum ores, calcined fire clay, quartzite or gannister, and mixtures thereof (which serve as the aggregate of this invention) can therefore be described as follows: 80 to 90% being −3 to −6 mesh with 50 to 90% thereof resting on a 65 mesh screen. The remaining portions of the aggregate are coarser than 3 or 6 mesh and finer than 65 mesh. For further information of the propriety of so describing the sizing of refractory material see ASTM designation: E11–61 and page 1111 et seq. of The Chemical Engineers' Handbook, Perry, third edition, published in 1950 by McGraw-Hill Book Company, Inc.

All laboratory evidence at this time indicates that finely divided silicon carbide additions to basic refractories are not as successful as they are with fireclay and high-alumina series. When basic refractories containing silicon carbide fines are heated, they seem to invariably bloat and disrupt. In a fireclay or high-alumina base, when the very slow oxidation of silicon carbide seems to produce $CO/CO_2$ and $SiO_2$, a reaction occurs which produces mullite which is physically and chemically compatible, while in magnesia bases silica can cause low-melting phases.

Certain other refractory oxides are compatible with the bases and additions of this invention, as is illustrated by Mix F of Table III, which contains a quartzite component.

Having thus described the invention in detail and with sufficient particularity as to enable those skilled in the art to practice it, what is desired to have protected by Letters Patent is set forth in the following claims.

We claim:

1. A particulate, unformed refractory material, consisting essentially of, by weight, about 70 to 95% of at least one ingredient material selected from the group consisting of alumina, aluminum ores, and fire clay, said ingredient material being 80 to 90% −3 mesh with 50 to 90% thereof being +65 mesh, and about 5 to 30% of silicon carbide, said silicon carbide being −100 to −325 mesh, said refractory material being free of ingredients which will vitrify at temperatures of about 2100° F.

2. A refractory material according to claim 1 in which said silicon carbide is at least about 5% −325 mesh.

3. A refractory material according to claim 1 in which substantially all of the silicon carbide is reduced to about −100 mesh.

4. An unfired refractory shape consisting essentially of, by weight, about 70 to 95% of at least one ingredient material selected from the group consisting of alumina, aluminum ores, and calcined fire clay, said ingredient material being 80 to 90% −3 mesh with 50 to 90% thereof being +65 mesh, and about 5 to 30% of silicon carbide, said silicon carbide being −100 to −325 mesh, but at least about 5% being −325 mesh, and said shape being free of ingredients which will vitrify at temperatures of about 2100° F. and resistant to wetting by molten copper and its alloys at this temperature.

5. A particulate, unformed refractory mixture consisting essentially of, by weight, about 85% of fire clay and about 15% of —325 mesh silicon carbide said fire clay being 80 to 90% —3 mesh with 50 to 90% thereof being +28 to +65 mesh, the mixture being free of ingredients which will vitrify at temperatures of about 2100° F.

6. A high alumina ramming mix consisting essentially of, by weight, about 80% of at least one material selected from the group consisting of alumina and aluminum ores, said material being 80 to 90% —3 mesh with 50 to 90% thereof being +28 to +65 mesh, and about 10% of —325 mesh silicon carbide, said mix being free of ingredients which will vitrify at temperatures of about 2100° F.

7. An unformed, particulate refractory material free of ingredients which will vitrify at temperatures of about 2100° F., and which material, when installed in a furnace resists wetting by molten copper and its alloys, consisting essentially of about 30 to 95% of at least one material selected from the group consisting of alumina, aluminum ores, and fireclay, said ingredient material being 80 to 90% —3 mesh with 50 to 90% thereof being +65 mesh, about 5 to 30% of —100 mesh silicon carbide, the remainder of the material being up to about 25% quartzite and up to about 15%, by weight, ball clay.

8. The refractory material of claim 7 in which a major portion of the material slected from the group consisting of alumina, aluminum ores, and fire clay, is about —3 mesh, and the quartzite is about —6 mesh.

9. A particulate, unformed refractory material consisting essentially of, by weight, about 40 to 95% of at least one ingredient material selected from the group consisting of alumina, aluminum ores, and fire clay, said ingredient material being 80 to 90% —3 mesh with 50 to 90% thereof being +65 mesh, and about 5 to 30% of silicon carbide, said silicon carbide being —100 to —325 mesh, and up to about 15% of said fire clay being —325 mesh ball clay as a plasticizer, said material being free of ingredients which will vitrify at temperatures of about 2100° F.

10. An unfired refractory shape consisting essentially of, by weight, about 70 to 95% of at least one ingredient material selected from the group consisting of alumina, aluminum ores, and calcined fire clay, said ingredient material being 80 to 90% —3 mesh with 50 to 90% thereof being +65 mesh, and about 5 to 30% of silicon carbide, said silicon carbide being —100 to —325 mesh, but at least about 5% being —325 mesh, and up to about 15% of said fire clay including —325 mesh ball clay as a plasticizer, said shape being free of ingredients which will vitrify at about 2100° F.

11. A particulate, unformed refractory mixture consisting essentially of, by weight, about 85% of fire clay of which up to about 15%, by weight, based on the total weight of the mixture, is —325 mesh ball clay, and about 15% of —325 mesh silicon carbide said fire clay being 80 to 90% —3 mesh with 50 to 90% thereof being +28 to +65 mesh, the mixture being free of ingredients which will vitrify at a temperature of about 2100° F.

12. A high alumina ramming mix consisting essentially of, by weight, about 80% of at least one material selected from the group consisting of alumina and aluminum ores, said material being 80 to 90% —3 mesh with 50 to 90% thereof being +28 to +65 mesh, and about 10% of —325 mesh silicon carbide, said mix being free of ingredients which will vitrify at a temperature of about 2100° F.

13. An unformed, particulate refractory free of material which will vitrify at temperatures of about 2100° F., and which, when formed, is resistant to wetting by molten copper and its alloys at 2100° F., consisting essentially of 30 to 95% of at least one material selected from the group consisting of alumina, aluminum ores, and fire clay, said material being 80 to 90% —6 mesh with 50 to 90% thereof being +65 mesh, about 5 to 30% of —100 mesh silicon carbide, the remainder of the material being up to about 25% quartzite and up to about 15%, by weight, ball clay.

References Cited by the Examiner
UNITED STATES PATENTS

| | | | |
|---|---|---|---|
| 789,452 | 5/05 | Queneau | 106—44 |
| 2,141,600 | 12/38 | Fisher | 106—44 |
| 2,246,226 | 6/41 | Walton | 106—64 |
| 2,388,080 | 10/45 | Riddle | 106—44 |
| 2,407,135 | 9/46 | Clark | 106—64 |

FOREIGN PATENTS

| | | |
|---|---|---|
| 847,965 | 9/60 | Great Britain. |

TOBIAS E. LEVOW, *Primary Examiner.*